United States Patent [19]

Monoi et al.

[11] Patent Number: 6,040,399
[45] Date of Patent: Mar. 21, 2000

[54] PREPARATION METHOD OF ETHYLENE BASE POLYMER

[75] Inventors: Takashi Monoi; Masakazu Yamamoto; Hidenobu Torigoe; Yasunori Takemoto, all of Oita, Japan

[73] Assignee: Japan Polyolefins Co., Ltd., Tokyo, Japan

[21] Appl. No.: 09/043,872

[22] PCT Filed: Aug. 20, 1997

[86] PCT No.: PCT/JP97/02881

§ 371 Date: Mar. 30, 1998

§ 102(e) Date: Mar. 30, 1998

[87] PCT Pub. No.: WO98/07762

PCT Pub. Date: Feb. 26, 1998

[30] Foreign Application Priority Data

Aug. 21, 1996 [JP] Japan .................................... 8-220208

[51] Int. Cl.$^7$ ....................................................... C08F 4/22
[52] U.S. Cl. .......................... 526/106; 526/109; 526/105; 526/130; 526/151; 526/152; 526/157; 526/922; 526/306

[58] Field of Search ..................................... 526/106, 104, 526/105, 130, 151, 306, 922, 152, 157

[56] References Cited

U.S. PATENT DOCUMENTS

| 5,723,399 | 3/1998 | Takemoto et al. ...................... 526/114 |
| 5,750,817 | 5/1998 | Tanaka et al. .......................... 585/520 |

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

An ethylene base polymer and a preparation method of an ethylene base polymer characterized in use of a catalyst comprising a chromium amide compound, a solid inroganic oxide calcined at 100 to 500° C. and alumoxane. According to the present invention, an ethylene base polymer with a wide molecular weight distribution, excellent shock and environmental stress cracking resistances, causing no melt fracture, and suitable for film forming and blow molding can be effectively prepared.

5 Claims, 1 Drawing Sheet

(A) Transition Metal Component (B) Organic Metal Component

PREPARATION METHOD OF ETHYLENE BASE POLYMER

FIELD OF THE INVENTION

This invention relates to a preparation method of an ethylene base polymer using a novel chromium catalyst, and more particularly, to a preparation method of an ethylene base polymer for use in film forming and blow molding which has a wide molecular weight distribution and is excellent in shock and environmental stress cracking resistances, and causes no melt fracture.

BACKGROUND OF THE INVENTION

A polymer of ethylene, and a copolymer comprising ethylene as a main portion and α-olefin (Hereafter, both compounds are called as an ethylene base polymer in this specification.) have been widely used as resin materials for various plastic products. Ethylene base polymers differ in required characteristics according to forming methods and applications each other. For example, polymers with a relatively low molecular weight and a narrow molecular weight distribution are suitable for products formed by injection molding and blow molding, whereas polymers with a relative high molecular weight and a wide molecular weight distribution are suitable for film forming and blow molding.

Molecular weight distribution relates to the surface texture of film or blown products. It has been considered that the wider the molecular weight distribution is, the smaller the roughness of the surface texture of the formed products is. Namely, even with polymers with a high molecular weight, products of high quality with good fluidity and no melt fracture on the surface of the formed products can be obtained. In addition, when a comparison is made among polymers with same molecular weight, one with a wider molecular weight distribution brings about ethylene base polymers with high density and, as a result, improves the mechanical strength of products. Moreover, when a comparison is made among polymers with same density, one with a wider molecular weight distribution improves the environmental stress cracking resistance (ESCR) of products. On the other hand, when a comparison is made among polymers with same molecular weight, one with a wider molecular weight distribution increases the density and crystallization and, as a result, decreases shock resistance. Accordingly, an ethylene base polymer with a wide molecular weight distribution which is excellent in shock resistance, and environmental stress cracking resistance (ESCR), and causes no melt fracture for film forming and blow molding have long been waited for.

It has been known fact that an ethylene base polymer with a wide molecular weight distribution can be obtained using a catalyst, generally known as a Phillips catalyst, which is made by carrying chromium trioxide or any compounds containing chromium able to be oxidized and changed into chromium trioxide under a certain activation condition carried on a solid inorganic oxide such as silica. However, an ethylene base polymer which has been prepared by a Phillips catalyst has a molecular weight distribution (Mw/Mn) of about 8 to 30 which is expressed as the ratio of weighted average molecular weight (Mw) to numbered average molecular weight (Mn). But, in some application, an ethylene base polymer with a wider molecular weight distribution than the above polymer is required. And also there is a problem in that ESCR is extremely low. Japanese Patent No. 2996/1969 (U.S. Pat. No. 3,324,095), Japanese Patent No. 3827/1969 (U.K. Patent No. 1,051,391), and Japanese Patent No. 1766/1972 (U.K. Patent No. 1,332,510) disclose that an ethylene base polymer with a wide molecular weight distribution can also be obtained using a catalyst where an ester of a chromic acid was carried on a solid inorganic oxide such as silica. An ethylene base polymer prepared using the above catalyst has fairly a wide molecular weight distribution with about 20 to 60 Mw/Mn and higher ESCR than that obtained using a Phillips catalyst, but, as a defect, has low shock resistance and causes melt fracture when at film forming or blow molding Therefore, this polymer has a problem in a practical application.

U.S. Pat. Nos. 5,104,841 and 5,137,997 disclose that an ethylene base polymer with a wide molecular weight distribution can also be obtained by using a catalyst where bis(trimethylsilyl)amide complex derived from a divalent chromium atom is carried on a solid inorganic oxide. Mw/Mn is as wide as 50 to 80. Though a molecular weight distribution is fairly wide, this catalyst is extremely low in polymerization activity so that there is a practical problem in productivity. Moreover, since bis (trimethylsilyl)amide complex derived from a divalent chromium atom is extremely sensitive to air, water, etc., it is very hard to handle so that this polymer has also a practical problem. In addition, this polymer has also another problem that the product has a low shock resistance.

Moreover, Japanese Patent Application Laid-open No. 503739/1995 (International Publication Number WO93/9149) discloses that an ethylene base polymer with a wide molecular weight distribution can be obtained by changing the molar ratio of alumoxane to chromium at polymerization using either of a catalyst where chromium acetylacetonate was carried on silica or a catalyst system using alumoxane. But, the preparation method is very complicated in controlling a process so that the method has a practical problem.

PROBLEMS TO BE SOLVED BY THE PRESENT INVENTION

Therefore, a principal objective of the present invention is to provide a method of effectively preparing an ethylene base polymer which solves the problems involved in the conventional methods and has a wide molecular weight distribution, and are excellent in shock and environmental stress cracking resistances, and causes no melt fracture simultaneously.

DISCLOSURE OF THE PRESENT INVENTION

The present inventors have made an intensive research and have solved the above-mentioned problems by using a catalyst which comprises an amide compound containing a trivalent chromium atom, a solid inorganic oxide calcined at a certain range of temperature and alumoxane. Namely, the present invention provides:

1) A preparation method of an ethylene base polymer is characterized in use of a catalyst which comprises an amide compound containing a trivalent chromium atom, a solid inorganic compound calcined at a temperature in the range of between 100 and 500° C. and alumoxane.

2) Another preparation method of an ethylene base polymer by repeating the same procedure as set forth in 1) except that the temperature range was replaced by between 200 and 450° C.;

3) Another preparation method of an ethylene base polymer by repeating the same procedure as set forth in 1) except that a catalyst which was obtained by reacting an amide compound containing a trivalent chromium atom carried on a solid inorganic oxide with alumoxane was used.

4) Another method of preparation method of ethylene base polymer by repeating the same procedure as set forth in 1) except that an ethylene base polymer was replaced by polyethylene; and 5) The other method of preparation method of ethylene base polymer by repeating the same procedure as set forth in 1) except that an ethylene base polymer was replaced by a copolymer of ethylene and α-olefin.

DETAILED DESCRIPTION OF THE INVENTION

Figure 1:
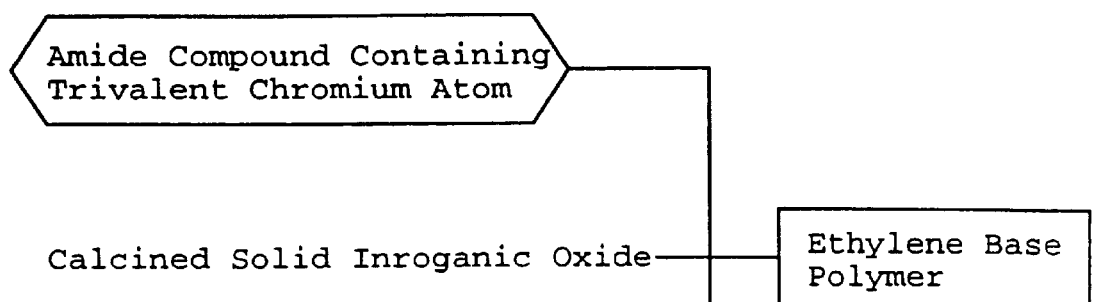
FIG. 1 is a preparation flow chart of a catalyst used for the preparation method of an ethylene base polymer of the present invention.
Figure 1:
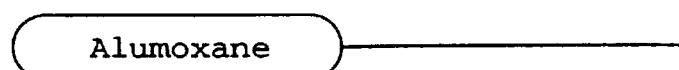

Hereafter, the present invention will be described in detail.

The first component of a catalyst component used in the present invention includes compounds containing a trivalent chromium atom represented by the following general formula (1),

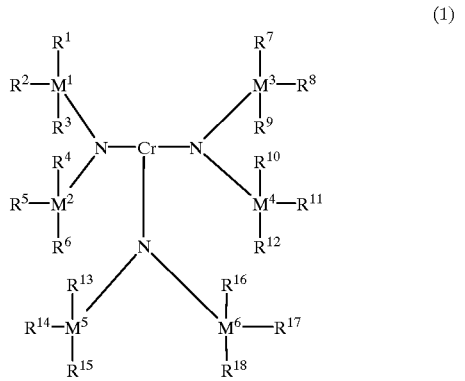

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$, with R's being same with or different from one another, are selected from among hydrogen or a $C_1$–$C_{18}$ hydrocarbyl group, wherein $M^1$, $M^2$, $M^3$, $M^4$, $M^5$ and M6 are carbon or silicon atoms. The specific examples of amide compounds represented by the general formula (1) include the following:
tris(dimethylamide)chromium(III),
tris(diethylamide)chromium(III),
tris(diisopropylamide)chromium(III),
tris(methylphenylamide)chromium(III),
tris(diphenylamide)chromium(III),
tris(bistrimethylsilylamide)chromium(III),
tris(bistriethylsilylamide)chromium(III),
tris(bistriphenylsilylamide)chromium(III),
tris(phenyltrimethylsilylamide)chromium(III),
tris(tert-butyltrimethylsilylamide)chromium(III),
tris(bis(dimethylphenylsilyl)amide)chromium(III),
tris(bis(diphenylmethylsilyl)amide)chromium(III),
tris(bis(dimethylvinylsilyl)amide)chromium(III),
each with tris(bistrimethylsilylamide)chromium(III) being especially preferred.

The second component (a solid inorganic oxide) of a catalyst used in the present invention are oxides of metals of groups 2, 4, 13 and 14 of the periodic table.

The specific examples include the following: magnesia, titania, zirconia, silica, alumina, silica-alumina, silica-taitania, silica-zirconia, aluminophosphate and the like or the mixtures thereof, with silica-alumina and silica being preferred. A solid inorganic oxide has the following characteristics:

specific surface area is 50 to 1000 $m^2/g$, preferably being 200 to 800 $m^2/g$;

pore volume is 0.5 to 3.0 $cm^3/g$, preferably being 0.7 to 2.5 $cm^3/g$;

average particle size is 10 to 200 $\mu$m, preferably being 30 to 150 $\mu$m.

It is preferred that a solid inorganic oxide is calcined at a specified temperature and is removed of water adsorbed, before employed.

Calcining of solid inorganic oxides is generally done in the dried flowing nitrogen gas gone through molecular sieves at 100 to 500° C., preferably being 200 to 450° C., for 30 minutes to 24 hours. It is preferred that the solid inorganic oxide is dried in a flowing state with a sufficient supply of nitrogen gas.

If the calcining temperature exceeds 500° C., the polymerization activity of ethylene into high molecular weight polyethylene decreases and, as a result, generation of an oligomer (e.g. 1-hexene as a trimer) will increase unfavorably. Alumoxane is a well known compound in the catalyst field and the preparation method and the structure thereof were described in detail in *Polyhedron*, 9, 429–453 (1990), Ziegler Catalysts, G. Fink etal. (Eds.) 57–82, Springer-Verlag (1995), etc.

The third component, alumoxane, of a catalyst used in the present invention is represented by the general formula (2) or (3):

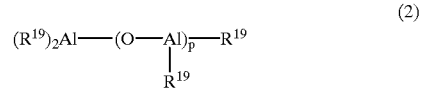

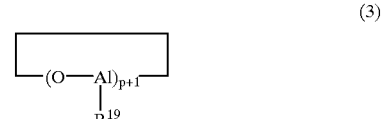

wherein $R^{19}$ is a hydrocarbyl group such as a methyl group, an ethyl group, a propyl group, an n-butyl group, an isobutyl group, a hexyl group, an octyl group, etc., preferably being a methyl group and an isobutyl group. P is an integer of 1 to 100, preferably being over 4, and especially preferably being over 8.

The preparation method of the above described compounds are publicly well known and include:

A method of adding trialkylaluminum to a suspension of a salt with crystallization water (such as copper sulfate hydrate and aluminum sulfate hydrate) in an inert hydrocarbon solvent such as pentane, hexane, heptane, cyclohexane, decane, benzene and toluene; and A method of reacting water in any form of a solid, a liquid and a gas with trialkylaluminum in a hydrocarbon solvent.

In addition, alumoxane represented by the general formula (4) or (5) may be used:

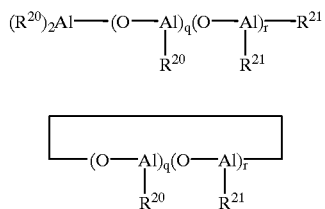

(4)

(5)

wherein $R^{20}$ is a hydrocarbyl group such as a methyl group, an ethyl group, a propyl group, an n-butyl group, an isobutyl group, a hexyl group, and an octyl group, preferably being a methyl group and an isobutyl group, and wherein $R^{21}$, being different for $R^{20}$, is selected from among hydrocarbyl groups such as a methyl group, an ethyl group, a propyl group, an n-butyl group, an isobutyl group, a hexyl group and an octyl group, and halogens such as chlorine and bromine, as well as hydrogen and hydroxyl groups. A plurality of $R^{20}$'s and $R^{21}$'s present in a molecular may be same with or different from one another in each group. q is an integer of 1 to 100, preferably being over 3. q+r is an integer of 2 to 100, preferably being over 6.

In the general formula (4) or (5), a unit described below

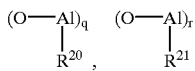

may be combined either in block, in regular, irregular, i.e., random, arrangements. These alumoxanes can be prepared by repeating the same method as with the alumoxanes in the general formulae described before except that two kinds or more of trialkylaluminum, or a combination of a kind or more of trialkylaluminum and a kind or more of dialkylaluminum monohydride, or dialkylaluminum monohalide is used instead of a kind of trialkylaluminum.

[Preparation of Catalyst]

A catalyst can be prepared by chemical reactions among a chromium amide compound, a solid inorganic oxide and alumoxane.

Namely, either one of the following two methods maybe used:

(A) A method that a chromium amide compound synthesized beforehand is carried on a solid inorganic oxide and is then reacted with alumoxane to make a catalyst.

(B) A method that a chromium amide compound is synthesized in the presence of a solid inorganic oxide and is carried on the solid inorganic oxide, and is then reacted with alumoxane, to make a catalyst.

In method (A), i.e., a synthesis method of a chromium amide compound represented by the general formula (1), trihalogenated chromium such as chromium trichloride and chromium trichloride tetrahydrofuran complex ($CrCl_3.3THF$) is generally reacted with alkalimetalamide such as lithium bis(trimethylsilyl)amide in an ether type solvent such as tetrahydrofuran at the molar ratio of alkalimetal to chromium being 3. In the above reaction, lithium chloride will be precipitated as a halogenated metal when, for example, chromium trichloride and lithium bis (trimethylsilyl)amide are reacted. A salt thus precipitated is filtered out. After that, the desired chromium amide compound is isolated through the recrystallization process or the like. Or, without doing isolation, after the halogenated alkali metal described above is removed, an ether type solvent is taken off under a reduced pressure and then the residues may be dissolved in an inert hydrocarbon solvent such as pentane, hexane, heptane, decane, cyclohexane, benzene, toluene and xylene, so as to make a product of chromium amide compound.

When a chromium amide compound is carried on a solid inorganic oxide, the operation is performed in an inert hydrocarbon such as pentane, hexane, heptane, decane, cyclohexane, benzene, toluene and xylene.

The carrying ratio of chromium atom to solid inorganic oxide is 0.01 to 10 wt %, preferably being 0.03 to 5 wt % and the reaction temperature is $-78°$ C. to the boiling point of the solvent used, preferably being $-20°$ C. to $60°$ C. and the reaction time is 10 min. to 24 hrs., preferably being 30 min. to 5 hrs.

After the carrying reaction, a solid component with good fluidity can be obtained by means of either removing the solvent under a reduced pressure or isolation by filtering. As another way, without removing the solvent, reaction with alumoxane may be performed succeedingly.

When the solid component described above is reacted with alumoxane, it is done in an inert hydrocarbon such as pentane, hexane, heptane, decane, cyclohexane, benzene, toluene and xylene. It is desirable that the reaction is done at the molar ratio of aluminum atom present in alumoxane to chromium atom present in a solid component being 1 to 1000, preferably being 5 to 300.

The reaction temperature is $-78°$ C. to the boiling point of the solvent used, preferably being $-20°$ C. to $60°$ C. The reaction time is 10 min. to 24 hrs., preferably being 30 min. to 5 hrs. After the reaction is terminated, either way is taken, one by removing the solvent under a reduced pressure or the other by isolation by filtering. Thus a catalyst with such a good fluidity as free flowing can be obtained.

In the method (B), a method is desirable that, after suspending both a chromium salt and a solid inorganic oxide in an ether type solvent, a solid component carried with a chromium amide compound which was obtained by treating with a corresponding metalamide beforehand is reacted with alumoxane, leading to a catalyst.

A chromium salt is chosen from trihalogenated chromium such as chromium trichloride, chromium trifluoride, chromium tribromide and chromium triiodide, preferably being chromium trichloride tetrahydrofuran complex ($CrCl_3.3THF$), as well as chromium trichloride.

When a chromium amide compound represented by a general formula (1) is obtained by reacting secondary amine or secondary silylamine with a metal in group 1 or 2 in the periodic table, the form of metalamide corresponding to each metal is used. At that time, lithium bis(trimethylsilyl) amide is preferred. An ether type solvent which is employed to suspend a chromium salt and a solid inorganic oxide is selected from among aliphatic or alicyclic ethers such as diethylether, diisopropylether, dioxane, 1,2-dimethoxyethane and tetrahydrofuran, preferably being diethyl ether and tetrahydrofuran.

Addition ratio of a chromium salt to a solid inorganic oxide is 0.01 to 10 wt % in terms of a chromium atom to a solid inorganic oxide, preferably being 0.03 to 5 wt %. The reaction between the suspension and metalamide is preformed at the molar ratio of metalamide to chromium being 3.

The reaction temperature is $-78°$ C. to the boiling point of a solvent employed, preferably being $-20°$ C. to $60°$ C. The reaction time is 10 min. to 24 hrs., preferably being 30 min. to 5 hrs. By the reaction described above a chromium amide compound is prepared and is immediately carried on a solid inorganic oxide in the same reaction system. After the reaction is terminated, a solid component with good fluidity can be obtained by either method of removing the solvent under a reduced pressure or separation by filtering.

Reaction of the said solid component with alumoxane is performed in an inert hydrocarbon such as pentane, hexane, heptane, decane, cyclohexane, benzene, toluene and xylene. At the reaction, it is desirable to adjust the volumes of the compound and the component such that the atomic ratio of aluminum atom in alumoxane to chromium atom in a solid component is 1 to 1000, preferably being 5 to 300.

The reaction temperature is −78° C. to the boiling point of the solvent employed, preferably being −20° C. to 60° C. The reaction time is 10 min. to 24 hrs., preferably being 30 min. to 5 hrs. After the reaction is terminated, a catalyst with such a good fluidity as free flowing can be obtained by either method of removing the solvent under a reduced pressure or separation by filtering.

When the preparation method of ethylene base polymers of the present invention is performed using the above-described catalyst, any of slurry polymerization, liquid phase polymerization such as solution polymerization and vapor phase polymerization is applicable. Liquid phase polymerization is generally performed in a hydrocarbon solvent. At that time, the hydrocarbon solvent is selected from among inert hydrocarbons such as propane, butane, isobutane, hexane, heptane, cyclohexane, benzene, toluene, xylene and a mixture thereof.

Vapor phase polymerization can apply a polymerization method which is generally known as fluidized bed, stirring bed, etc. in the presence of an inert gas. In some cases vapor phase polymerization also can employ the method which allows the presence of a media to remove reaction heat, i.e., a condensing mode.

The reaction temperature for liquid and vapor phase polymerizations is generally 0 to 300° C., practically being 20 to 200° C. A catalyst concentration and the ethylene pressure in a reactor may be optional as long as polymerization progresses satisfactorily. Hydrogen, etc. can also be present into the polymerization system in order to adjust the molecular weight.

Moreover, as required and needed, copolymerization can be performed by incorporating an α-olefin such as propylene, 1-butene, 1-hexene, 4-methy-1-pentene, 1-octene and a mixture thereof together with ethylene into the reactor. The amount of α-olefin in the copolymer is less than 10 mol %, preferably being less than 5 mol %.

By embodying the method of the present invention, an ethylene base polymer with the following characteristics can be obtained:
Number-average molecular weight (Mn) is 2,000 to 20,000;
Weight-average molecular weight (Mw) is 200,000 to 600,000;
Molecular weight distribution in terms of Mw/Mn is as wide as 30 to 80;
Shock and environmental stress cracking resistances are excellent; and
Melt fracture is not appeared.

BEST MODE FOR CARRYING OUT THE INVENTION

Hereinafter, the present invention will be described in more detail by examples and comparative examples. However, the present invention is not limited to the examples.

Such physical properties as molecular weight, molecular weight distribution, melt flow rate, density, die swell ratio, tensile impact and ESCR of polymers obtained by the examples and the comparative examples were measured by the following method:

a) Molecular Weight and Molecular Weight Distribution:

Number-average molecular weight (Mn) and weight-average molecular weight (Mw) were obtained from the product ethylene base polymers by means of gel permeation chromatography (GPC) under the following conditions:

Measurement conditions of gel permeation chromatography:
apparatus: WATERS 150C Model
column: Shodex-HT806M
solvent: 1,2,4-trichlorobenzene
temperature: 135° C.
concentration of sample: 2 mg/5 ml
Universal assessment using monodisperse polystyrene fraction was applied.

As far as the molecular weight distribution which is shown in terms of the ratio of Mw to Mn (Mw/Mn) (where the larger the Mw/Mn is, the wider the molecular weight distribution is.) is concerned, actual measurements were corrected after n-alkane and data of classified linear polyethylene with Mw/Mn being equal to or less than 1.2 had been applied to the formula of molecular weight and detector sensibility described in "Size exclusion chromatography (High performance liquid chromatography for polymers)" 96 page, Sadao Mori, Kyoritsu Pub. Co. and then the sensitivity of molecular weight M had been determined using the following formula:

$$\text{Sensitivity of Molecular } M = a + b/M,$$

wherein a and b, both being constant, are 1.032 and 189.2 respectively.

b) Melt Flow Rate

In accordance with Table 1, Condition 7 of JIS K-7210 (1996), measurements were performed under the conditions of the temperature of 190° C. and load of 21.6 kgf and was shown in terms of HLMFR.

c) Density

In accordance with JIS K-7112 (1996), measurements were performed.

d) Die Swell Ratio (hereinafter described as SR):

SR is shown in terms of expansion rate (%) of outer diameter of the extrudate to the diameter of the orifice which is measured at the same time when HLMFR is measured using the same apparatus as in HLMFR.

e) Tensile Impact

In accordance with ASTM D-1822, tensile impact is measured at 23° C. and −40° C. The measurements represent shock resistance.

f) ESCR

In accordance with JIS K-6760 (1996), test was done by the method of BTL. F50 value is regarded as ESCR.

EXAMPLE 1

(1) Synthesis of tri(bistrimethylsilylamide)chromium (III) (Cr[N(SiMe$_3$)$_2$]$_3$):

In accordance with the method described in J. Chem. Soc. (A), 1433 (1971), tris(bistrimethylsilylamide)chromium(III) was synthesized.

1.93 g (12.2 mmol) of anhydrous chromium trichloride were placed in a 200 ml flask which was purged with nitrogen in advance and was added with 30 ml of tetrahydrofuran making the content be in a slurry state. The resulting slurry was cooled to 0 to 3° C. in an ice bath and was then added with 36.6 ml (36.6 mmol and molar ratio of amide to chromium being 3) of a 1.0 mol/l lithium bis (trimethylsilyl)amide (a product of Aldrich Co.) solution in hexane, followed by stirring at 25° C. for 4 hours. The solvent was thoroughly removed under a reduced pressure after confirmed that chromium trichloride had completely disappeared. The resulting deep green block was added with 100 ml of hexane and dissolved therein and was then filtered with a glass wool screen, to remove lithium chloride generated as a byproduct. The chromium concentration of the resulting solution was 0.12 mmol—Cr/ml (6.2 mg—Cr/ml).

(2) Preparation of Catalyst 3.0 g of silica #952 (a product of W. R. Grace, with average particle size of 80 $\mu$m, specific surface area of 300 $m^2$/g and pore volume of 1.6 $cm^3$/g) calcined at 300° C. for 8 hours were placed in a 100 ml flask which was purged with nitrogen in advance and was added with 30 ml of hexane making the content be in a slurry state. The resulting slurry was added with 0.48 ml (the amount of chromium atom carried is 0.10 wt %) of chromium amide solution prepared in the above-described (1) followed by stirring at 40° C. for one hour. After that, the slurry was added with 4.8 ml (molar ratio of aluminum/chromium is 100.) of a 1.2 mol/l isobutylalumoxane (a product of Toso-Akzo Co.) solution in hexane, followed by stirring at 40° C. for 2 hours. The solvent was removed under a reduced pressure and a free flowing catalyst was obtained.

(3) Polymerization 0.6 l of isobutane and 0.12 g of the catalyst prepared in the above described (2) were placed in a 1.5 l autoclave and the inside of the autoclave was heated to 90° C. Then, ethylene was pushed into the autoclave and left at 14 kg/$cm^2$ of ethylene partial pressure for one hour, allowing polymerization to progress. After that, gas component of the content was discharged and the polymerization was terminated. As a result, 154 g of polyethylene were obtained. The polymerization activity per 1 g of catalyst per 1 hour of polymerization time was 1280 g/g·hr. Measurements of molecular weight, molecular weight distribution, melt flow rate, density, die swell ratio, tensile impact and ESCR of the polyethylene thus obtained are shown in Table 1.

EXAMPLE 2

Another catalyst was prepared and the polymerization using the catalyst thus obtained was performed by repeating the same procedure as set forth in Example 1 except that at Example 1(2) a 1.2 mol/l hexane solution (Prod. No. being MMAO-3A) of methylalumoxane (a product of Toso-Akzo Co.) having 10% of an isobutyl group was used instead of isobutylalumoxane. As a result, 162 g of polyethylene were obtained. Polymerization activity per 1 g of catalyst per 1 hour of polymerization time was 1350 g/g·hr. Measurements of physical properties are shown in Table 1.

EXAMPLE 3

Another catalyst was prepared and the polymerization using the catalyst thus obtained was performed by repeating the same procedure as set forth in Example 1 except that at Example 1 (2), after carrying reaction of chromium amide, the solvent was removed under a reduced pressure and a free flowing solid component was obtained. 30 ml of toluene were added to the resulting solid component, followed by adding 2.2 ml of a 2.6 mol/l toluene solution of methylalumoxane (a product of Toso-Akzo Co.) instead of isobutylalumoxane. As a result, 138 g of polyethylene were obtained. Polymerization activity per 1 g of catalyst per 1 hour of polymerization time was 1150 g/g·hr. Physical properties of polyethylene are shown in Table 1.

EXAMPLE 4

Another catalyst was prepared and the polymerization using the catalyst thus obtained was performed by repeating the same procedure as set forth in Example 1 except that at Example 1(2), the addition of chromium amide solution was changed into 0.96 ml (the amount of chromium atom carried is 0.20 wt %) and the addition of isobutylalumoxane was changed into 9.6 ml (molar ratio of aluminum/chromium is 100). As a result, 230 g of polyethylene were obtained. The polymerization activity per 1 g of catalyst per 1 hour of polymerization time was 1920 g/g·hr. Physical properties of the polyethylene are shown in Table 1.

EXAMPLE 5

Another catalyst was prepared and the polymerization using the catalyst thus obtained was performed by repeating the same procedure as set forth in Example 1 except that at Example 1(2), the addition of isobutylalumoxane was 2.4 ml (molar ratio of aluminum/chromium is 50). As a result, 148 g of polyethylene were obtained. Polymerization activity per 1 g of catalyst per 1 hour of polymerization time was 1230 g/g·hr. Physical properties of the polyethylene are shown in Table 1.

EXAMPLE 6

Another sample was prepared and the polymerization was performed using the catalyst thus obtained by repeating the same procedure as set forth in Example 1 except that at Example 1 (2), silica of Grade CARiACT P-3 (with average particle size of 35 $\mu$m, specific surface area of 720 $m^2$/g and pore volume of 1.2 $cm^3$/g ) (a product of Fuji Silicia Co.) calcined at 300° C. for 8 hours was used instead of silica of Grade 952. As a result, 173 g of polyethylene were obtained. Polymerization activity per 1 g of catalyst per 1 hour of polymerization time was 1440 g/g·hr. Physical properties of the polyethylene are shown in Table 1.

EXAMPLE 7

(1) Synthesis of tris(diisopropylamide)chromium(III) (Cr[N(CHMe$_2$)$_2$]$_3$)

1.93 g (12.2 mmol) of anhydrous chromium trichloride were placed in a 200 ml flask which was purged with nitrogen beforehand and was added with 30 ml of tetrahydrofuran making the content into a slurry state. The resulting slurry was cooled to between 0 and 3° C. in an ice bath and was then added with 36.6 ml (36.6 mmol and the molar ratio of amide to chromium being 3) of a 1.0 mol/l tetrahydrofuran solution of lithium diisopropylamide (a product of Aldrich Co.), followed by stirring at 25° C. for 4 hours. The solvent was thoroughly removed under a reduced pressure, after confirming that chromium trichloride had completely disappeared. The resulting deep brown block was added with 100 ml of hexane and dissolved therein and afterwards filtered with a glass wool screen to remove lithiumchloride produced as a byproduct. The chromium concentration of the resulting solvent was 0.10 mmol—Cr/ml (5.2 mg—Cr/ml).

(2) Preparation of Catalyst and Polymerization

Another catalyst was prepared and the polymerization using the catalyst thus obtained was performed by repeating the same procedure as set forth in Example 1 except that at Example 1 (2), 0.58 ml (chromium atom carried being 0.10 wt %) of hexane solution of tris(diisopropylamide) chromium(III) obtained as in (1) above was added instead of tris(bistrimethylsilylamide)-chromium(III). As a result, 135 g of polyethylene were obtained. Polymerization activity per 1 g of catalyst per 1 hour of polymerization time was 1130 g/g·hr. The physical properties are shown in Table 1.

EXAMPLE 8

(1) Preparation of Catalyst 3.0 g of silica of Grade CARiACT P-3 (a product of Fuji Silicia Co. with average particle size being 35 $\mu$m, specific surface area being 720 m²/g and pore volume being 1.2 cm³/g) calcined at 300° C. for 8 hours, 18.3 mg (chromium atom carried being 0.20 wt %) of anhydrous chromium trichloride, and 30 ml of tetrahydrofuran were placed in a 100 ml flask which had been purged with nitrogen in advance, making the mixture of the above three components be in a slurry state. While stirring the resulting slurry at 25° C., 0.35 ml (0.35 mmol and the molar ratio of amide to chromium being 3) of a 1.0 mol/l hexane solution of lithium bis(trimethylsilyl) amide (a product of Aldrich Co.) was added to the slurry, followed by succeeding stirring at 25° C. for 2 hours. The solvent was then completely removed under a reduced pressure so that a solid component was obtained. A 30 ml of hexane was added to the resulting solid component to make the content be in a slurry state. 9.6 ml (molar ratio of aluminum to chromium being 100) of a 1.2 mol/l hexane solution of isobutylalumoxane (a product of Toso-Akzo Co.) was added to the slurry, followed by stirring at 40° C. for 2 hours. The solvent contained in the slurry was completely removed under a reduced pressure and a free flowing catalyst was obtained.

(2) Polymerization

Polymerization was performed by repeating the same procedure as set forth in Example 1 except that the catalyst obtained by the above (1) instead of the catalyst of Example 1 was used. As a result, 145 g of polyethylene were obtained. Polymerization activity per 1 g of catalyst per 1 hour of polymerization time was 1210 g/g·hr. Physical properties of the polyethylene are shown in Table 1.

EXAMPLE 9

Gas-phase polymerization

A vertical vibration reactor was prepared in a similar way as has been employed when a flow bed reactor was prepared as was described in *Eur. Polym. J.*, Vol. 21, 245 (1985). The vertical vibration reactor had volume of 150 cm³, diameter of 50 mm, and vibration rate of 420 cycles/min (7 Hz) with vibration stroke of 6 cm. Using the vertical vibration reactor, gas-phase polymerization was performed.

100 mg of a catalyst obtained in Example 1 (2) was sealed in a capsule under a nitrogen circumstance. The capsule was put in the reactor purged with nitrogen gas in advance, followed by heating at 87° C., 5 kg/cm² of ethylene were pushed in with pressure in the reactor. After the reactor was shaken until the capsule therein was broken, a polymerization started.

In order to maintain an ethylene pressure in the reactor, ethylene was continuously supplied through a flexible joint. Ethylene was polymerized at 90° C. for one hour and then the supply of ethylene was ceased. After the reactor was cooled down to a room temperature, a remaining gas was purged. As a result, 43 g of polyethylene were obtained. Polymerization activity per 1 g of catalyst per 1 hour of polymerization time was 430 g/g·hr. Physical properties of the polyethylene thus obtained are shown in Table 1.

EXAMPLE 10

Another polymerization was performed by repeating the same procedure as set forth in Example 1 except that 3 kg/cm² of hydrogen were additionally incorporated at the polymerization step of Example 1 (3). As a result, 143 g of polyethylene were obtained. Polymerization activity per 1 g of catalyst per 1 hour of polymerization time was 1190 g/g·hr. Physical properties of the polyethylene thus obtained are shown in Table 1.

EXAMPLE 11

Another polymerization was performed by repeating the same procedure as set forth in Example 1 except that 10 ml of 1-hexene were added with the help of pressure of ethylene at the polymerization step of Example 1 (3) and effected a copolymerization. As a result, 161 g of polyethylene were obtained. Polymerization activity per 1 g of catalyst per 1 hour of polymerization time was 1340 g/g·hr. Physical properties of polyethylene are shown in Table 1.

COMPARATIVE EXAMPLE 1

A comparative polymerization was performed by repeating the same procedure as set forth in Example 1 (3) except that the catalyst used was, being a Phillips catalyst, 969ID catalyst (a product of W. R. Grace, with chromium atom carried being 1.0 wt %) calcined at 600° C. for 30 hours and the polymerization temperature was 100° C. As a result, 144 g of polyethylene were obtained. Polymerization activity per 1 g of catalyst per 1 hour of polymerization time was 1200 g/g·hr. Physical properties of polyethylene are shown in Table 1. It was founded that the molecular weight distribution was narrower than those obtained in Examples 1 to 11 and ESCR was very low.

COMPARATIVE EXAMPLE 2

(1) Synthesis of bis(triphenylsilyl)chromate ($CrO_2(OSiPh_3)_2$)

In accordance with U.S. Pat. No. 2,863,891, bis (triphenylsilyl)chromate was synthesized by reacting chromium trioxide with triphenylsilanol.

(2) Preparation of Catalyst 3.0 g of Silica Grade 952 (a product of W. R. Grace, with average particle size of 80 μm, specific surface area of 300 cm³/g and pore volume of 1.6 m³/g) calcined at 500° C. for 6 hours were put in a 100 ml flask purged with nitrogen in advance and was added with 30 ml of hexane, making the content be in a slurry state. 1.15 ml (chromium atom carried was 0.20 wt %) of a 0.1 mol/l hexane solution of bis (triphenylsilyl)chromate obtained in (1) were added to the slurry and stirred at 25° C. for one hour. Succeedingly, 0.96 ml (molar ratio of aluminum to chromium being 10) of a 1.2 mol/l hexane solution of triethylaluminum (a product of Toso-Akzo Co.) was added to the resulting solution and stirred at 25° C. for one hour. A solvent was removed under a reduced pressure and a free flowing catalyst was obtained.

(3) Polymerization

Another polymerization was performed by repeating the same procedure as set forth in Example 1 except that the catalyst obtained in (2) above was used. As a result, 150 g of polyethylene were obtained. Polymerization activity per 1 g of catalyst per 1 hour of polymerization time was 1250 g/g·hr. Physical properties of the polyethylene thus obtained are shown in Table 1. Molecular weight distribution was wide. ESCR was higher than that of Comparative Example 1. Tensile impact was low. Since an extruded product caused a melt fracture at the time of HLMFR measurements, SR was unable to measure.

COMPARATIVE EXAMPLE 3

(1) Synthesis of bis(bistrimethysilylamide)chromium(II)·THF complex ($Cr[N(SiMe_3)_2]_2(THF)_2$)

Bis(bistrimethysilylamide)chromium(II)·THF complex was prepared in accordance with the method described in *Z. anorg. allg. Chem.*, 457, 38(1979).

(2) Preparation of Catalyst:

Following the method described at Example 1 (2), instead of tris(bistrimethylsilylamide)chromium(III), 0.96 ml (with chromium atom carried being 0.10 wt %) of a 0.060 mol/l hexane solution of bis(bistrimethylsilylamide)chromium(II)·THF complex obtained in (1) above was added. After a reaction of carriage of above-described chromium amide compound, a drying process under a reduced pressure was taken to obtain a solid component. All procedures in Example 1 were repeated except that no reaction with isobutylalumoxane was performed in this case.

(3) Polymerization:

Another polymerization was performed by repeating the same procedures as set forth in Example 1 except that 0.12 g of the solid component obtained in (2) above and 1.0 ml of 1.0 mol/l hexane solution of triethylaluminum (a product of Toso-Akzo Co.) were put in an autoclave. As a result, 26 g of polyethylene were obtained. Polymerization activity per 1 g of catalyst per 1 hour of polymerization time was 220 g/g·hr. Physical properties of the polyethylene thus obtained are shown in Table 1. Polymerization activity was extremely lower than both a trisamide compound derived from trivalent chromium and a product derived from alumoxane. Tensile impact was also low.

COMPARATIVE EXAMPLE 4

Preparation of a catalyst and the succeeding polymerization were performed by repeating the same procedure as set forth in Example 1 except that 1.2 mol/l hexane solution of triisobutylaluminum (a product of Toso-Akzo Co.) was employed instead of isobutylalumoxane at Example 1 (2). As a result, 2 g of polyethylene were obtained. Polymerization activity per 1 g of catalyst per 1 hour of polymerization time was 17 g/g·hr. Polymerization activity was extremely low compared with a product obtained by using isobutylalumoxane. Because of the low yield of the polymer thus obtained, physical properties of the polymer were unable to measure.

COMPARATIVE EXAMPLE 5

Another polymerization was performed by repeating the same procedure as set forth in Example 1 except that silica Grade 952 calcined at 600° C. instead of the same grade of silica calcined at 300° C. was used. Moreover, 0.96 ml (with chromiumatom carried being 0.20 wt %) of chromium amide solution and 9.6 ml (with molar ratio of aluminum to chromium being 100) of a 1.2 mol/l hexane solution of isobutylalumoxane were added. As a result, though ethylene supplied was consumed all the while polymerization was going on, only 1.2 g of polyethylene were obtained. After the polymerization reaction, a solvent was sampled and put into analysis by a gas chromatography. It was founded that 32 g of 1-hexene were generated. Polymerization activity per 1 g of catalyst per 1 hour of polymerization time was 10 g/g·hr. Polymerization activity was extremely low compared with that obtained using silica calcined at 300° C. Trimer of ethylene, i.e., 1-hexene, was the main product instead of polyethylene. Because of the low yield of the polymer thus obtained, physical properties of the polymer were unable to measure.

COMPARISON EXAMPLE 6

The other preparation of catalyst and succeeding polymerization were performed by repeating the same procedure as set forth in Example 1 except that 0.96 ml (with chromium atom carried being 0.10 wt %) of a 0.060 mol/l hexane solution of bis(bistrimethylsilylamide)chromium(II)·THF complex obtained in Comparative Example 3(1) was employed instead of tris(bistrimethylsilylamide)chromium (III). As a result, 25 g of polyethylene were obtained. Polymerization activity per 1 g of catalyst per 1 hour of polymerization time was 210 g/g·hr. The polymerization activity was extremely low compared with that obtained by using a trisamide compound derived from a trivalent chromium atom. Physical properties of polyethylene thus obtained are shown in Table 1. Both SR and tensile impact were lower than that obtained by using a trisamide compound derived from a trivalent chromium atom.

TABLE 1

| Example No. | Polymerization Activity (g/g · hr) | Mn × 10$^{-4}$ | Mw × 10$^{-4}$ | Mw/Mn | HLMFR (g/10 min) | SR (%) | Density (g/cm$^3$) | Tensile Impact (kgf · cm/cm$^2$) 23° C. | Tensile Impact (kgf · cm/cm$^2$) −40° C. | ESCR (hr) |
|---|---|---|---|---|---|---|---|---|---|---|
| 1 | 1280 | 0.71 | 44.0 | 62.0 | 1.2 | 56 | 0.9581 | 1160 | 960 | 240 |
| 2 | 1350 | 0.72 | 43.3 | 60.1 | 1.2 | 58 | 0.9582 | 1150 | 950 | 260 |
| 3 | 1150 | 0.70 | 42.5 | 60.7 | 1.4 | 65 | 0.9582 | 1150 | 950 | 230 |
| 4 | 1920 | 0.63 | 43.1 | 68.4 | 1.6 | 60 | 0.9583 | 1120 | 930 | 280 |
| 5 | 1230 | 0.73 | 42.5 | 58.2 | 1.2 | 57 | 0.9582 | 1170 | 960 | 220 |
| 6 | 1440 | 0.71 | 44.0 | 62.0 | 1.2 | 54 | 0.9580 | 1160 | 960 | 240 |
| 7 | 1130 | 0.61 | 40.5 | 66.4 | 2.1 | 67 | 0.9583 | 1150 | 940 | 270 |
| 8 | 1210 | 0.72 | 44.0 | 61.1 | 1.2 | 55 | 0.9582 | 1150 | 930 | 250 |
| 9 | 430 | 0.84 | 45.1 | 53.7 | 1.0 | 52 | 0.9576 | 1260 | 1010 | 220 |
| 10 | 1190 | 0.63 | 38.5 | 61.1 | 3.6 | 50 | 0.9588 | 1020 | 860 | 230 |
| 11 | 1340 | 0.64 | 43.2 | 67.5 | 2.3 | 67 | 0.9531 | 1340 | 1180 | 260 |
| Comparative Example 1 | 1200 | 4.85 | 42.0 | 8.7 | 1.3 | 60 | 0.9572 | 900 | 720 | 25 |
| Comparative Example 2 | 1250 | 0.82 | 42.7 | 52.1 | 1.1 | * | 0.9580 | 500 | 390 | 85 |
| Comparative Example 3 | 220 | 0.64 | 43.4 | 67.8 | 1.1 | 62 | 0.9581 | 410 | 280 | 125 |
| Comparative Example 4 | 17 | — | — | — | — | — | — | — | — | — |
| Comparative Example 5 | 10 | — | — | — | — | — | — | — | — | — |
| Comparative Example 6 | 210 | 0.72 | 44.1 | 61.3 | 1.2 | 46.0 | 0.9580 | 750 | 630 | 165 |

*Measurements were unnable to carry out, because a melt fracture phenomenon occurred.

INDUSTRIAL APPLICABILITY

According to the present invention, a high quality ethylene base polymer with a wide molecular weight distribution, excellent shock and environmental stress cracking resistances, causing no melt fracture, and suitable for film forming and blow molding can be prepared effectively and advantageously in an industrial scale.

We claim:

1. A preparation method of an ethylene base polymer comprising a step of polymerizing ethylene in the presence of a catalyst comprising (1) an amide compound comprising a trivalent chromium atom, (2) a solid inorganic oxide calcined at 100 to 500° C. and (3) alumoxane.

2. The preparation method of claim 1, wherein a solid inorganic oxide calcined at 200 to 450° C. is used.

3. The preparation method of claim 1, wherein a catalyst obtained by carrying an amide compound containing a trivalent chromium atom on to a solid inorganic oxide, followed by reacting with alumoxane is used.

4. The preparation method of claim 1, wherein an ethylene base polymer is polyethylene.

5. The preparation method of claim 1, wherein an ethylene base polymer is a copolymer of ethylene and α-olefin.

* * * * *